Sept. 3, 1957 C. R. FISHER, JR 2,805,288
MULTI-OFFICE TELEPHONE SYSTEM
Filed Nov. 12, 1953 8 Sheets-Sheet 1

INVENTOR.
CHARLES R. FISHER JR.
BY F. H. Henson
AGENT

Sept. 3, 1957 C. R. FISHER, JR 2,805,288

MULTI-OFFICE TELEPHONE SYSTEM

Filed Nov. 12, 1953 8 Sheets-Sheet 3

Sept. 3, 1957 C. R. FISHER, JR 2,805,288

MULTI-OFFICE TELEPHONE SYSTEM

Filed Nov. 12, 1953 8 Sheets-Sheet 4

Sept. 3, 1957 C. R. FISHER, JR 2,805,288

MULTI-OFFICE TELEPHONE SYSTEM

Filed Nov. 12, 1953 8 Sheets-Sheet 8

United States Patent Office 2,805,288

Patented Sept. 3, 1957

2,805,288

MULTI-OFFICE TELEPHONE SYSTEM

Charles R. Fisher, Jr., Rochester, N. Y., assignor, by mesne assignments, to General Dynamics Corporation, a corporation of Delaware Application November 12, 1953, Serial No. 391,579

8 Claims. (Cl. 179—27)

The present invention relates to multi-office telephone systems in general and more particularly to an interexchange trunk circuit for use between a main dial office or a tandem office and a community dial office.

In such a system it is desirable, for economic reasons, to utilize the same trunk circuit for extending calls from either local dial equipment or a toll board over a trunk line to a distant community dial office. When the same trunk circuit is used for both types of calls, however, the problem of proper supervision exists since a toll operator requires flash busy supervision for the purpose of providing a visual indication as to the progress of the call, while flash busy in the local switch train is highly undesirable.

It is well known in the art that automatic collect and message register apparatus, associated with the local dial equipment on calls from paystations and metered lines, respectively, is operated in response to answer supervision. It is necessary, therefore, to prevent the application of flash busy to the local dial equipment so that the paystation and message register apparatus will not be falsely operated on an incompleted call. It is also desirable to prevent the application of reverse battery clicks to the exchange subscriber's receiver.

Accordingly, it is a general object of this invention to provide an interexchange trunk circuit which is accessible to either a toll board or local dial equipment in a first exchange for extending calls to a second exchange.

It is a further object of the invention to provide a trunk circuit of the type disclosed which will return the required supervisory signals to either the toll board or the local dial equipment.

It is a more specific object of this invention to provide an interexchange trunk circuit which will repeat a steady supervisory signal to either a calling toll board or calling local dial equipment and will repeat a flashing supervisory signal only to the calling toll board.

Briefly, the invention accomplishes the above cited objects by providing a two way trunk circuit, accessible to both local dial equipment and a toll board on outgoing calls, which discriminates between steady and flashing supervisory signals returned over the trunk line from the distant office. The trunk circuit is arranged to repeat both steady answer supervision and flashing busy supervision to the toll board over the HS conductor. Answer supervision is repeated to local dial equipment by reverse battery and a timing device in the trunk circuit prevents the application of reverse battery on flash busy.

The timing device in the trunk circuit comprises a slow release relay which has a longer release time than the interval of time between succeeding flashes in the flash busy signal. If steady answer supervision is received, the relay releases to reverse battery. If flashing supervision is received, the relay remains operated to prevent the reversal of battery.

The invention, both as to the organization and method of operation together with objects and advantages thereof, will best be understood from the following description when read in connection with the accompanying drawings.

The drawings consist of nine figures on eight sheets and, when arranged according to Fig. 9, show the present invention.

Figure 1:
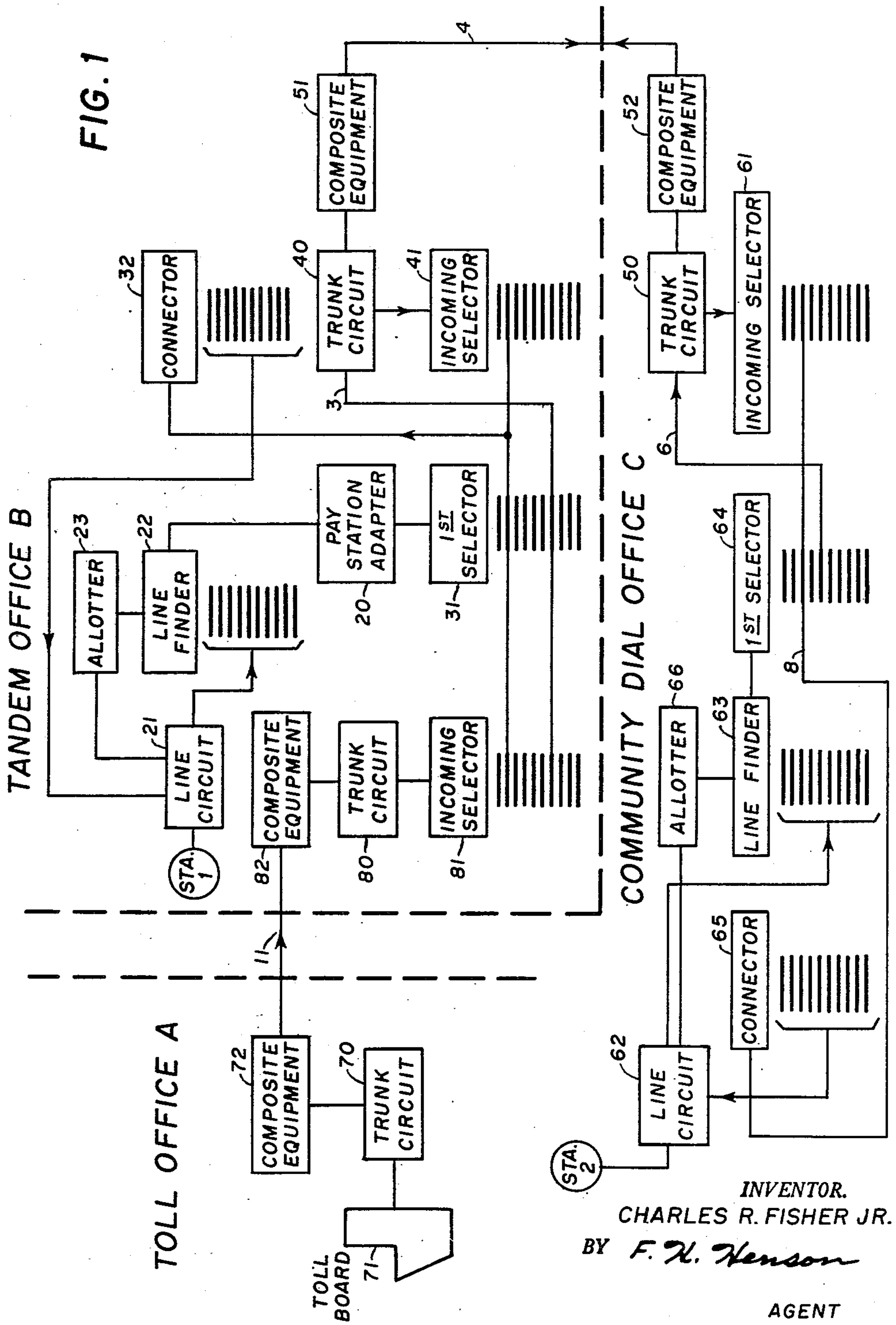
Fig. 1 shows the trunking diagram of the described system.

The general operation of the system can best be understood by reference to the trunking diagram of Fig. 1. As shown, the system comprises toll office A, tandem office B, and community dial office C. Trunk line 11 interconnects offices A and B and trunk line 4 interconnects offices B and C.

The toll board 71 in toll office A may be of the type shown and described in the copending Reagan application, Serial No. 331,627, filed January 16, 1953, and assigned to the same assignee as the present application. Calls for office B or C are extended from the toll board to outgoing trunk circuit 70 which is connected over trunk line 11 to incoming trunk circuit 80 in tandem office B. Incoming selector 81 in office B is directly associated with trunk circuit 80. Trunk circuits 70 and 80 have been shown as one-way for the purpose of simplifying the disclosure. It is to be understood that in practice these trunk circuits would be two-way so that subscribers in offices B and C would have access to toll office 70.

The switching circuits in the tandem and community dial offices have been shown as including a flat type step-by-step switch of the type sold under the trademark "XY." For a detailed description of this switch, reference may be had to the Frank A. Morris Patent 2,567,650, which issued September 11, 1951, and is assigned to the same assignee as the present invention. Briefly, the switch has a main set of brushes which move horizontally in a primary direction to select a level of terminals and then move into the banks to select a particular set of terminals in the selected level. For the purpose of making Fig. 1 more compact, the switch banks have been shown below rather than to the side of the box which indicates a particular switching circuit. In a flat type switch, the brushes encounter the first level of the switch bank as they move away from the switch. Therefore the level directly beneath the box has been designated level 1, while the level furthest away from the box has been designated level 0.

In the tandem office B, the second bank level of incoming selector 81 is shown connected to connector 32 to enable the toll operator in office A to extend calls to local subscribers in office B. The seventh level of incoming selector 81 is shown connected by cable 3 to trunk circuit 40 to enable the toll operator in office A to extend calls to local subscribers in office C.

Local subscribers in tandem office B, such as Sta. 1, can extend calls to other local subscribers in office B through the local switch train comprising line finder 22, paystation adapter 20, first selector 31, and from the second level of first selector 31 to connector 32. Paystation adapter 20 is of the type which discriminates between calls from ordinary subscribers and paystations, and is effective only in the event that the call originates at a paystation. A suitable adapter and associated paystation equipment is shown and described in detail in the copending Pharis application, Serial No. 149,072, filed March 11, 1950, and assigned to the same assignee as the present application.

The seventh level of first selector 31 is shown connected by cable 3 to trunk circuit 40 to enable subscribers in office B to extend calls to subscribers in office C. It is to be noted that trunk circuit 40 is accessible to the toll board 71 through the banks of incoming selector 81, and it is also accessible to subscribers of office B through the banks of first selector 31.

Trunk circuit 40 is connected over trunk line 4 to trunk circuit 50 in office C. The third level of incoming selector 61 in office C, which is directly associated with trunk circuit 50, is shown connected to connector 65 which has access to local subscribers, such as Sta. 2.

Local subscribers, such as Sta. 2 in office C, can extend calls to other local subscribers in office C through the local switch train comprising line finder 63, first selector 64 and connector 65. The fifth level of first selector 64 is shown connected by cable 6 to trunk circuit 50 for the purpose of routing calls to subscribers in office B. On a call which is incoming from office C to office B, incoming selector 41 is directly associated with trunk circuit 40. The second level of incoming selector 41 is shown connected to connector 32 which, as previously mentioned, has access to subscribers' lines such as Sta. 1.

The dial equipment in offices B and C is of the conventional 4-wire type and has been shown in block and fragmentary form in the drawings of this application. If a more complete understanding of this equipment is desired, reference may be had to several copending applications. Selectors 31, 41, 64 and 81 may be of the type shown and described in the copending Pharis application, Serial No. 260,736, filed December 8, 1951, and assigned to the same assignee as the present application. Connectors 32 and 65 may be of the type disclosed in the copending Elliott application, Serial No. 271,408, filed February 13, 1952, and assigned to the same assignee as the present application.

In the drawings and description, the exchange battery is shown as plus and minus and described as ground and battery. It is to be understood that in this system the positive terminal of the battery is grounded and is, therefore, referred to as ground. The negative terminal of the battery is referred to as battery.

A detailed description of the system follows.

CALL FROM STATION STA. 1 IN TANDEM OFFICE B TO STATION STA. 2 IN COMMUNITY DIAL OFFICE C

Figure 2:
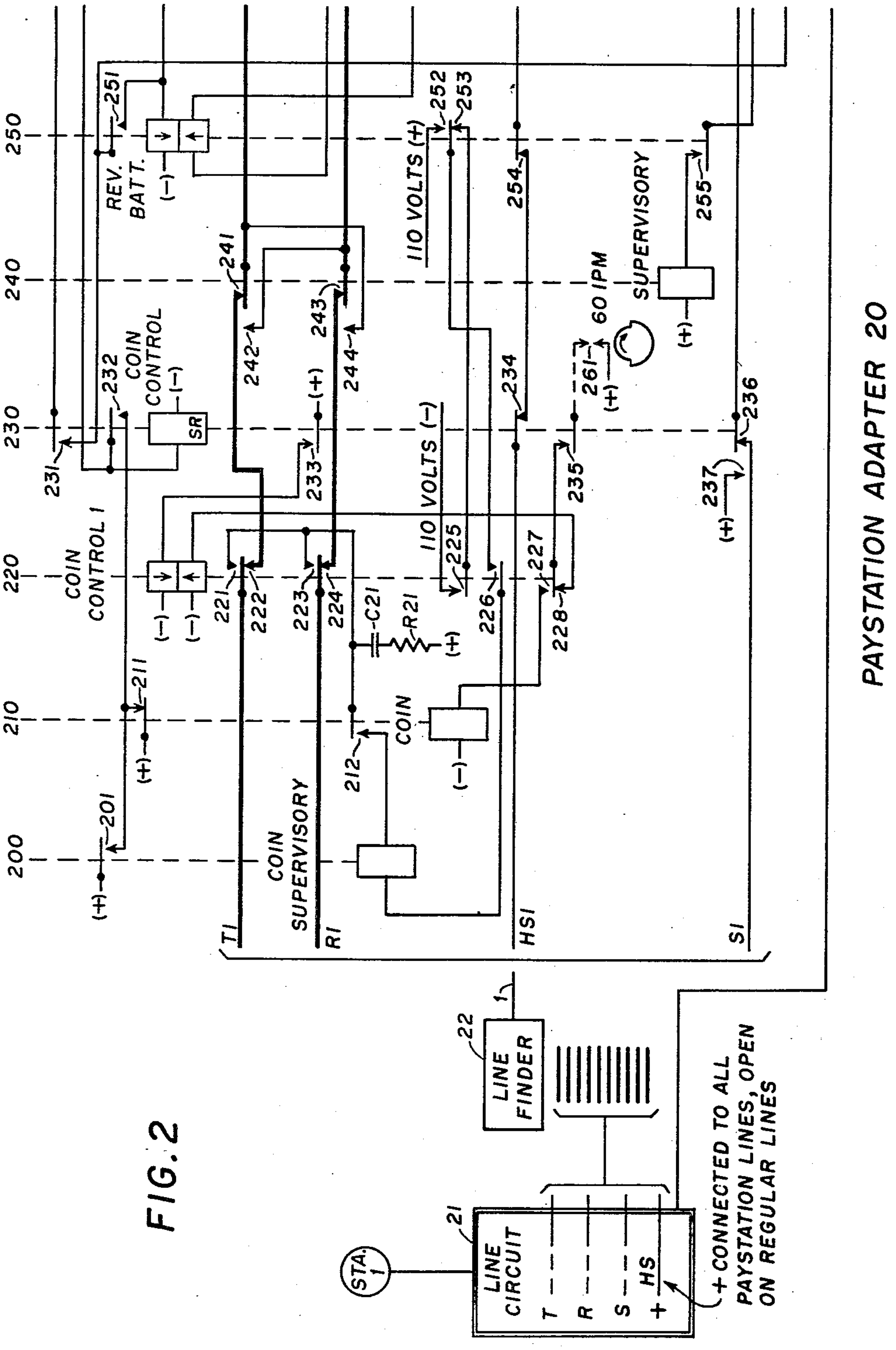
Figs. 2 and 3 show a paystation adapter circuit which is connected between a line finder and a first selector in the local switch train of a tandem office.
Figure 3:
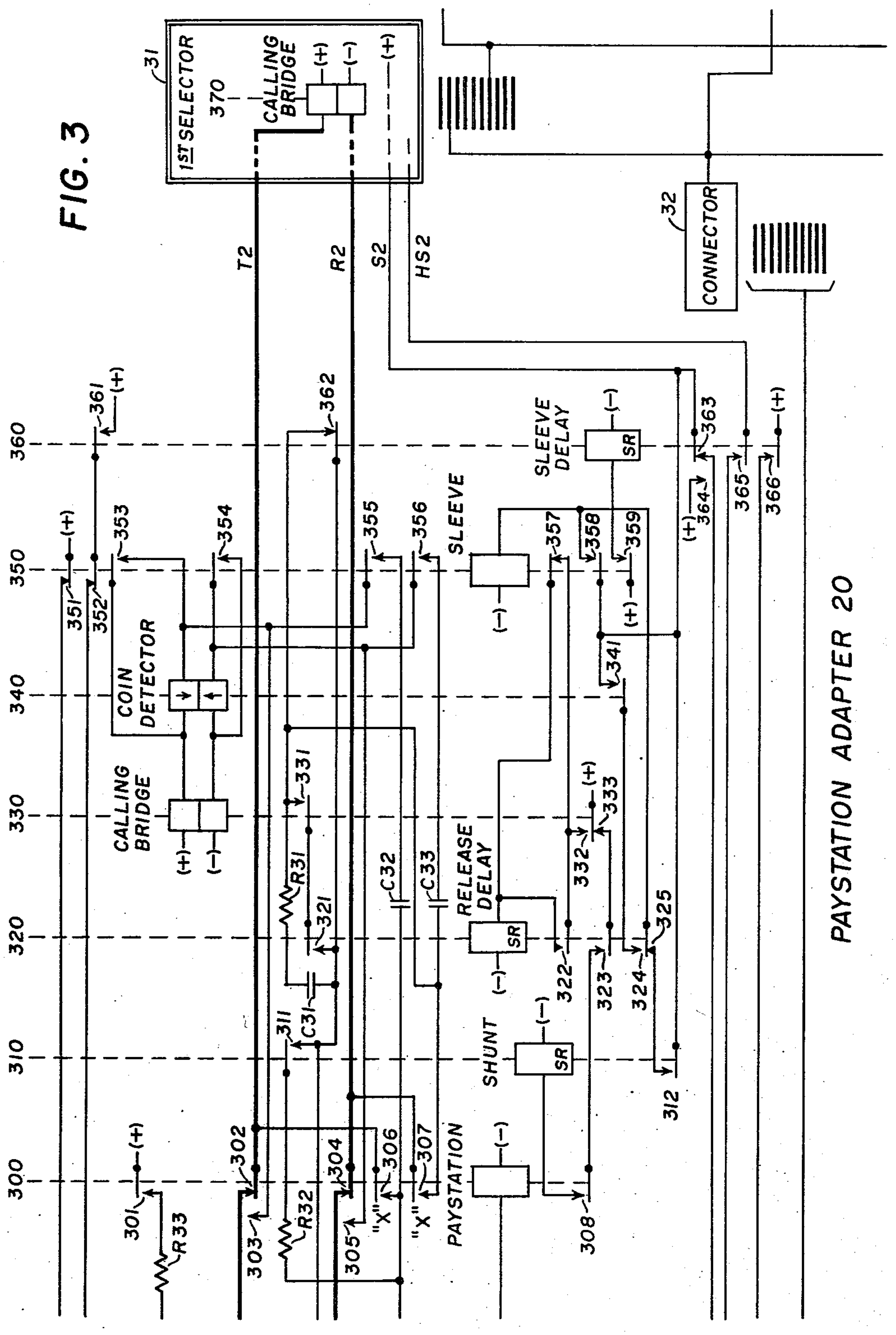
Figure 4:
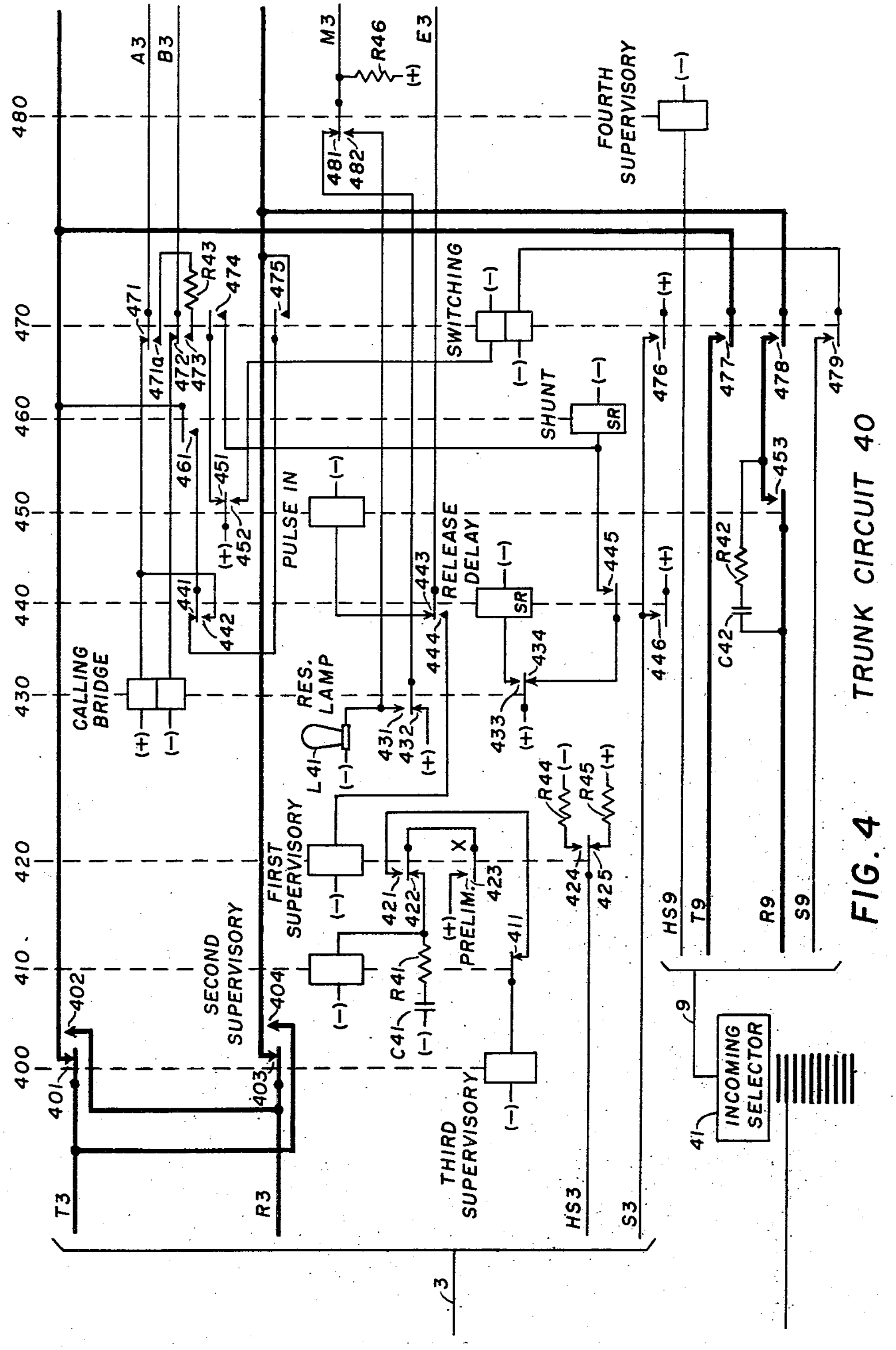
Fig. 4 shows the two-way trunk circuit in a tandem office.
Figure 5:
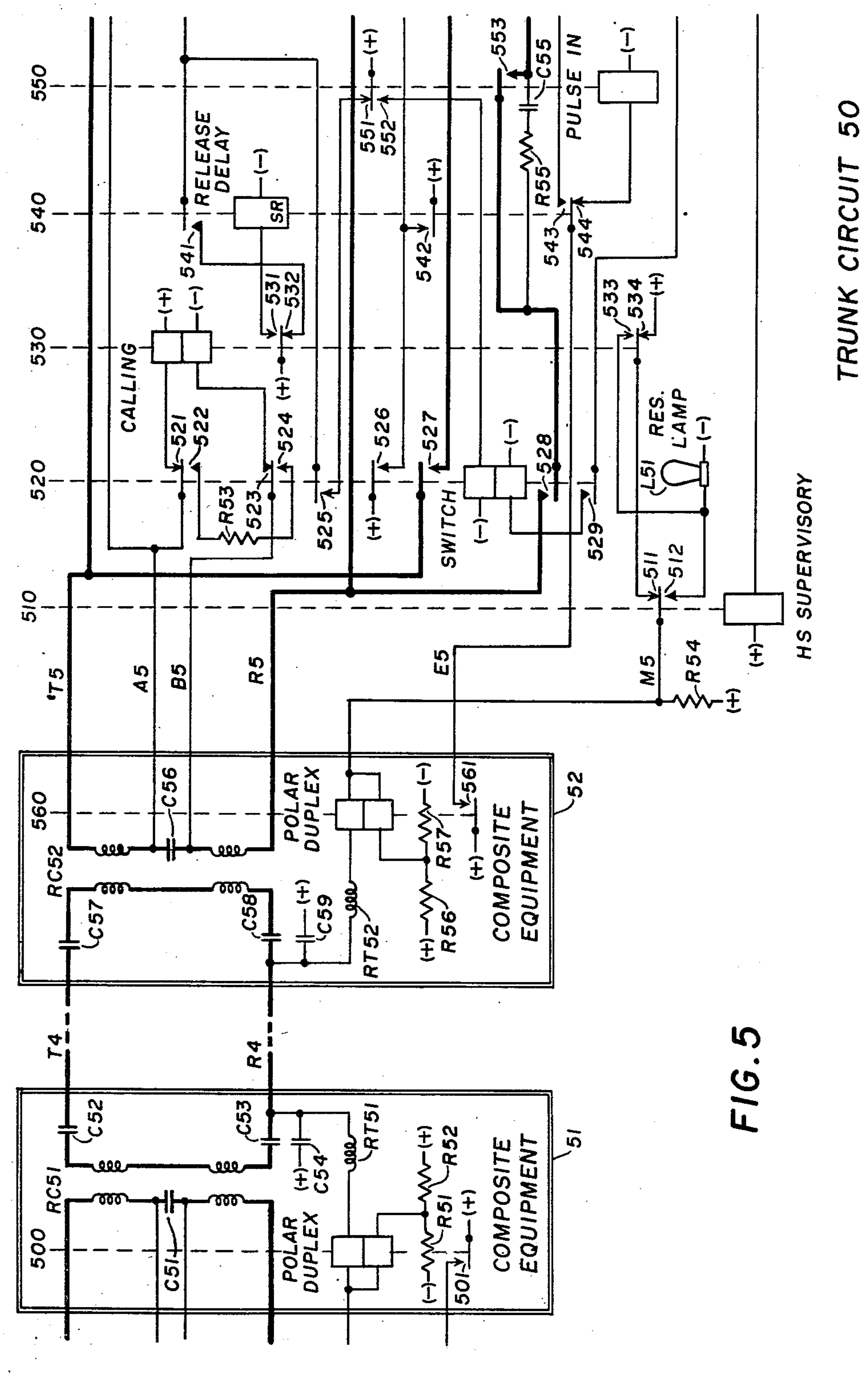
Fig. 5 shows composite equipment and a part of the two-way trunk circuit in the community dial office.
Figure 6:
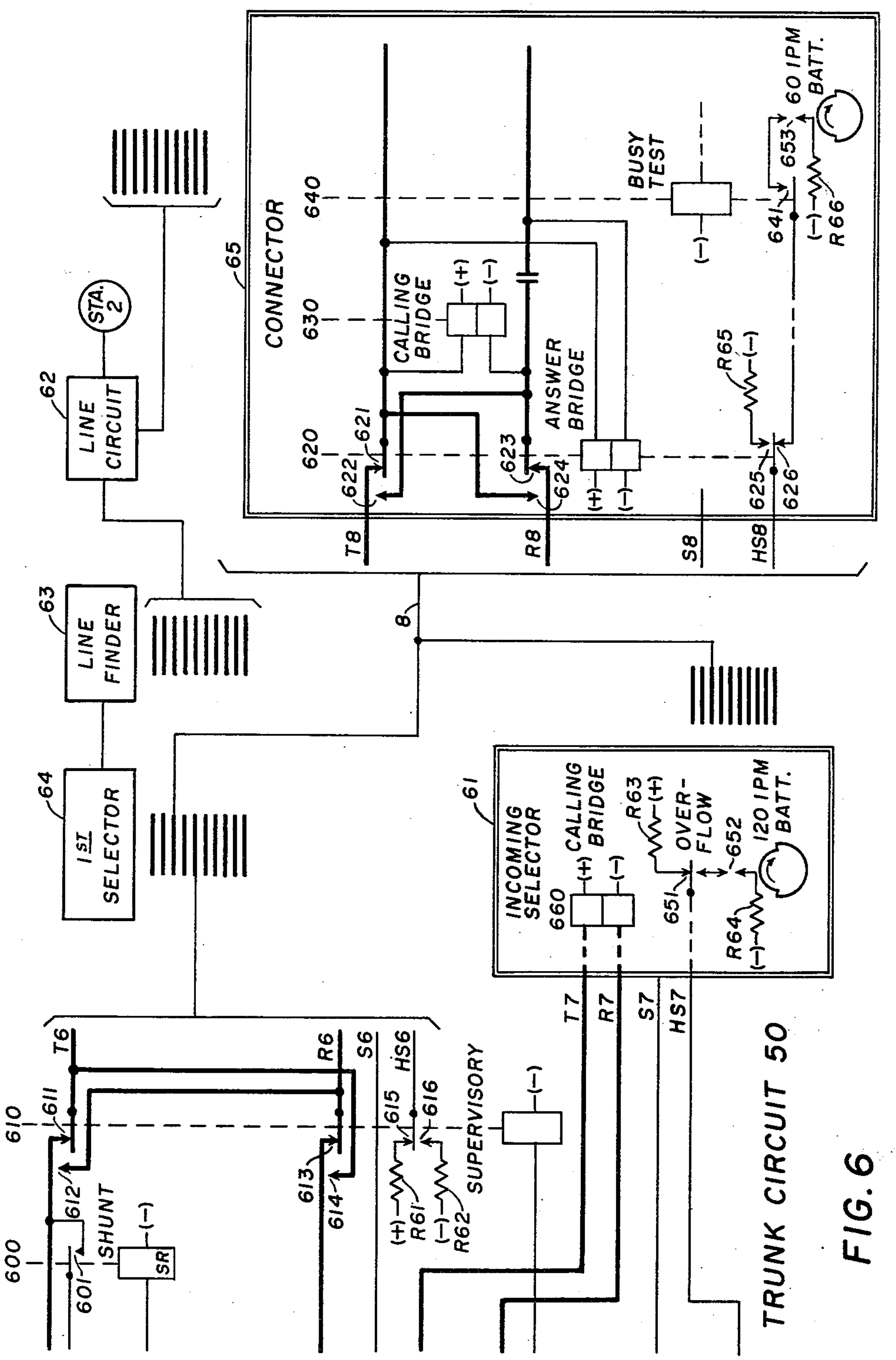
Fig. 6 shows the remainder of the trunk circuit in the community dial office and skeletonized drawings of an incoming selector and a connector in the community dial office.
Figure 7:
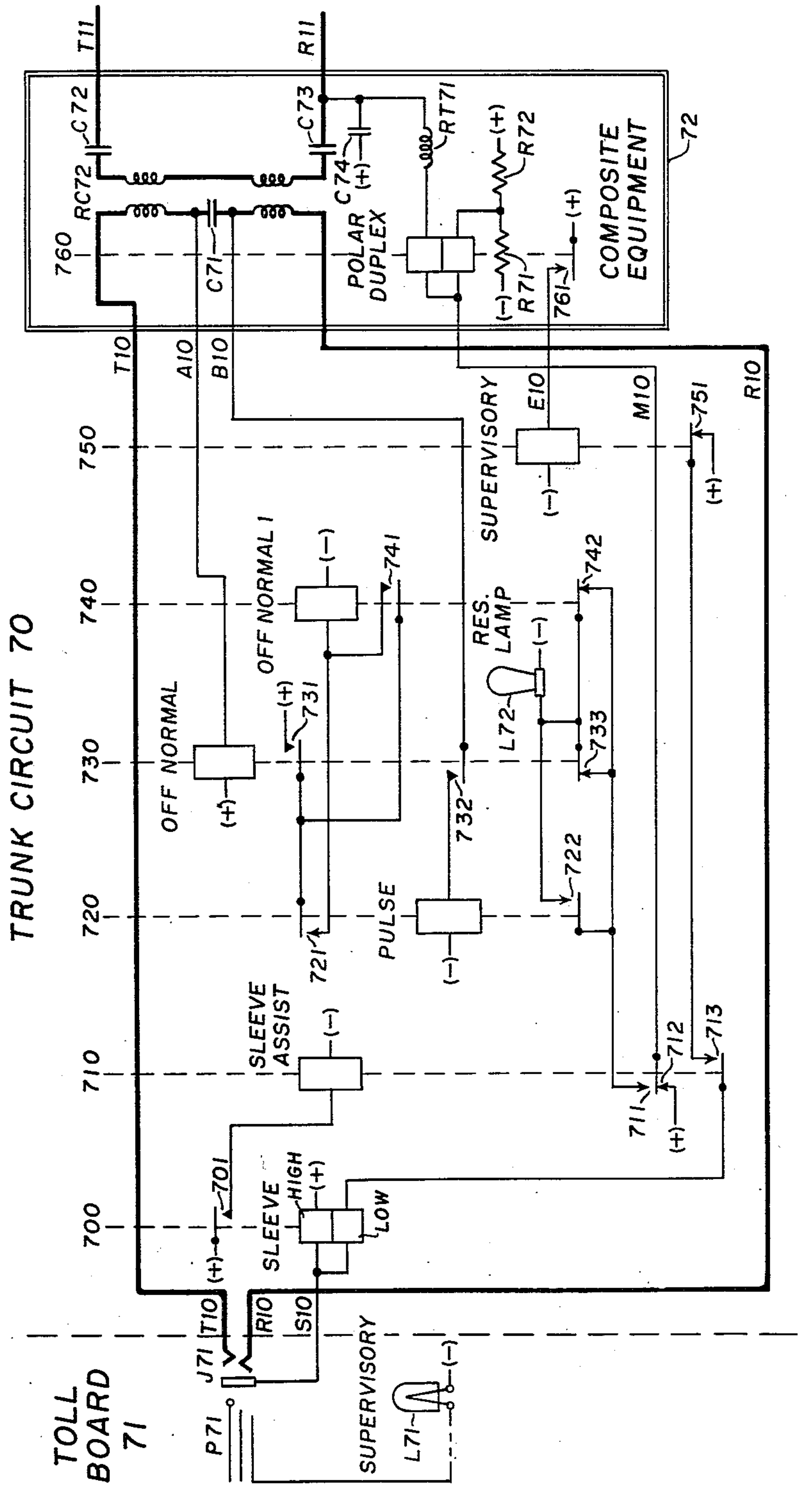
Fig. 7 shows a skeletonized version of a toll cord circuit at a toll board and an outging trunk circuit in a toll office.
Figure 8:
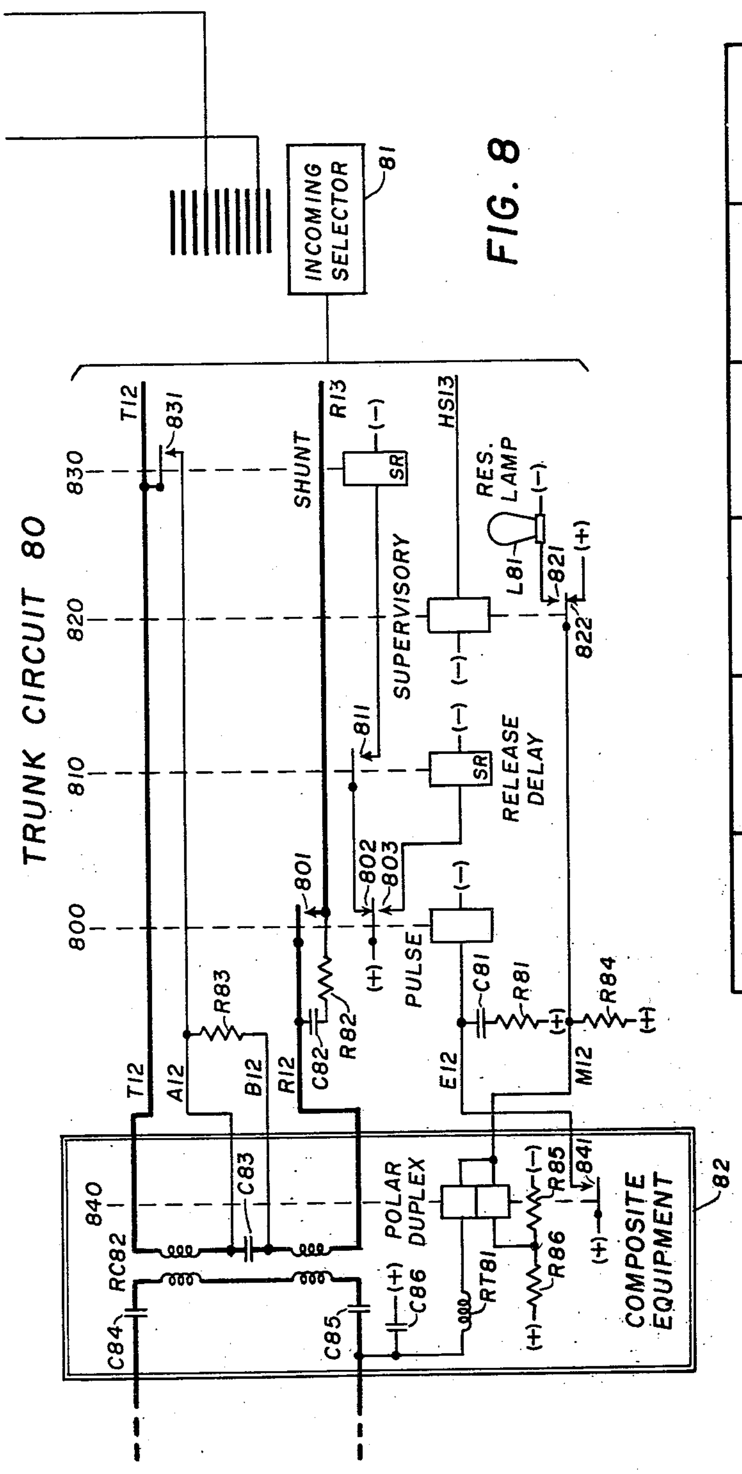
Fig. 8 shows an incoming trunk circuit in a tandem office.
Figure 9:
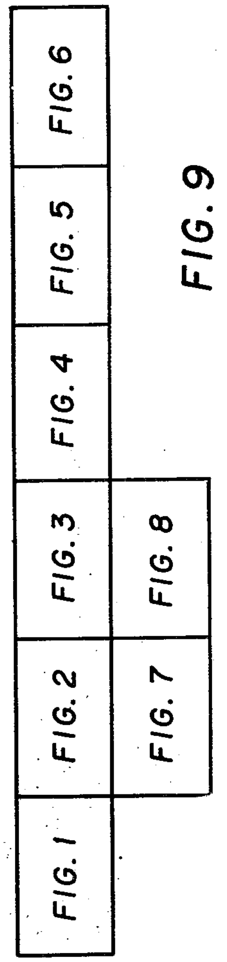

It will first be assumed that station Sta. 1 is a paystation and that ground is connected to the HS terminal associated with line circuit 21 in the banks of line finder 22. Referring to Fig. 2, when the subscriber at station Sta. 1 lifts his receiver, line circuit 21 and line finder 22 function in the well known manner to connect the line circuit conductors through to the tip, ring, sleeve, and hunt conductors T1, R1, S1, and HS1, respectively, which are associated with paystation adapter 20.

Ground potential on the HS bank terminal in line circuit 21 is routed through the line finder 22 to the HS1 conductor in the paystation adapter 20, through unoperated contacts 234 of relay 230, unoperated contacts 254 of relay 250 and the winding of paystation relay 300 to battery. Relay 300 operates in this circuit.

In response to the operation of relay 300 a loop is closed to the calling bridge relay 370 in first selector 31 over the following path: ground, upper winding of the calling bridge relay 370, conductor T2, operated preliminary make contacts 306 on relay 300, lower winding of relay 250, unoperated contacts 362 of relay 360, operated preliminary make contacts 307 on relay 300, conductor R2 and through the lower winding of relay 370 to battery. At contacts 301, relay 300 closes ground through resistor R33, and through the upper bias winding of reverse battery relay 250 to battery. Relay 250 does not operate at this time since its windings are differentially connected. Seizure of the paystation adapter and the operation of paystation relay 300 also closes a circuit for the operation of the calling bridge relay 330 of the paystation adapter over the following circuit: ground, upper winding of relay 330, upper winding of coin detector relay 340, operated contacts 303 of relay 300, unoperated contacts 241 of relay 240, unoperated contacts 222 of relay 220, conductor T1, loop of the subscribers' station, conductor R1, unoperated contacts 224 of relay 220, unoperated contacts 243 of relay 240, operated contacts 305 of relay 300, the lower winding of relay 340 and the lower winding of relay 330 to battery. Relay 340 does not operate in this circuit since it is differentially connected.

Relay 330 operates and closes an operating circuit for release delay relay 320 from ground on its contacts 332, through unoperated contacts 357 on sleeve relay 350, and the winding of relay 320 to battery. An alternate loop is now closed to the calling bridge relay 370 of the first selector 31 by operated contacts 321 on relay 320 in series with operated contacts 331 on relay 330. However, this circuit is ineffective at this time since it is shunted by normal or closed contacts 362 on relay 360. Ground returned from first selector 31 over conductor S2 is connected through unoperated contacts 363 on relay 360, unoperated contacts 236 on relay 230, to conductor S1 for the purpose of holding operated the line finder and the line circuit cut-off relay in a well known manner.

When the calling paystation subscriber deposits a coin, the loop circuit is unbalanced, as shown and described, for example, in the copending Pharis application, Serial No. 149,072, and serves to operate differential coin detector relay 340. Sleeve relay 350 now operates from ground on conductor S2, through operated contacts 341 on relay 340, operated contacts 324 on relay 320, and its winding to battery. Relay 350, at its operated contacts 353 and 354, shunts the upper and lower windings, respectively, of relay 340 to effectively remove it from the circuit and cause its release. Relay 350 locks itself operated through its now operated contacts 358 to ground on conductor S2. Dial tone returned from the first selector 31, over conductors T2 and R2, is connected through condensers C32 and C33 and through operated contacts 355 and 356 on relay 350 to conductors T1 and R1, respectively. Operation of sleeve relay 350 also closes an obvious circuit from ground through its operated contacts 359 and through the winding of sleeve delay relay 360 to battery.

Relay 360 operates in this circuit and opens contacts 362 to remove the shunt from the impulsing contacts 331 on relay 330. Also, relay 360 substitutes a local ground at operated transfer contacts 364 for the ground on conductor S2 through break contacts 363 for connection to conductor S1.

The connection of dial tone to the tip and ring conductors T1 and R1, respectively, informs the paystation subscriber that he may now dial the desired number.

In response to the dial impulses, calling bridge relay 330 pulses the previously described loop to relay 370, in first selector 31, at contacts 331. Upon the first release of relay 330 in response to the first dial pulse, shunt relay 310 operates over a circuit extending from ground through unoperated contacts 333 of relay 330, operated contacts 323 of relay 320, operated contacts 308 of relay 300, and the winding of relay 310 to battery.

At operated contacts 311, relay 310 connects resistor R32 in parallel with the lower winding of relay 250 to improve the quality of impulses delivered to the calling bridge relay of first selector 31. If it be assumed that the first digit dialed is "7," the impulses of the first digit cause a suitable switch in selector 31 to step to the seventh level. The selector then searches for an idle trunk in that level and switches through in any suitable manner to seize trunk circuit 40.

The previously described loop closed by paystation adapter 20 to conductors T2 and R2, is connected to conductors T3 and R3 when the selector 31 switches through. Calling bridge relay 430 in trunk circuit 40 now operates over a circuit extending from ground through the upper winding of relay 430, through unoperated contacts 471 of relay 470, over the A3 conductor to composite equipment 51, the upper left winding of repeat coil RC51, unoperated contacts 401 on relay 400, over the T3 conductor, through the previously described loop in paystation adapter 20, conductor R3, unoperated contacts 403 on relay 400, the lower left winding of repeat coil RC51 in composite equipment 51, conductor B3, unoperated contacts 472 of relay 470, and through the lower winding of relay 430 to battery.

In response to the operation of relay 430, battery through resistance lamp L41 is connected through operated contacts 431 on relay 430, unoperated contacts 481 on relay 480 to the M3 lead to composite equipment 51, through the upper winding of polar duplex relay 500, through the retard coil RT51 over conductor R4 of the composited trunk line, retard coil RT52, the upper winding of polar duplex relay 560, the M5 conductor, unoperated contacts 511 on relay 510, and unoperated contacts 534 on relay 530 to ground. Relay 560 operates in this circuit but relay 500 remains unoperated because of the opposing connection of its windings.

The operation of polar duplex relay 560 in composite equipment 52 serves to connect ground to conductor E5 associated with trunk circuit 50, and through unoperated contacts 544 on relay 540 to operate the pulse-in relay 550 in trunk circuit 50.

Returning now to the operation of trunk circuit 40, the operation of relay 430 also closed an obvious operating circuit for release delay relay 440 through operated contacts 433 of relay 430. At contacts 443, relay 440 disconnects the pulse-in relay 450 from conductor E3 and, at operated contacts 444, connects the winding of first supervisory relay 420 to the E3 conductor. Also at operated contacts 446, relay 440 connects ground to conductor S3 to hold operated the switch through relay (not shown) in first selector 31 in a conventional manner.

In trunk circuit 50, the operation of relay 550 serves to operate the switch relay 520, through operated contacts 552 of relay 550. A loop is now closed to the calling bridge relay 660 in incoming selector circuit 61 in a circuit extending from ground, upper winding of relay 660, conductor T7, operated contacts 527 on relay 520, conductor T5, upper right winding of the repeat coil RC52 in the composite equipment 52, conductor A5, operated contacts 522 on relay 520, resistor R53, operated contacts 524 on relay 520, conductor B5, lower right winding of repeat coil RC52 in composite equipment 52, conductor R5, operated contacts 528 on relay 520, operated contacts 553 on relay 550, conductor R7, and the lower winding of relay 660 to battery. At contacts 526 relay 520 connects ground to conductor S6 to mark trunk circuit 50 as busy in the banks of first selector 64.

The dialing of the second digit in the directory number now pulses relay 330 in paystation adapter 20 which, at contacts 331, interrupts the loop to relay 430 in trunk circuit 40. Relay 430 repeats the impulses of the digit at its contacts 431 to pulse polar duplex relay 560 in composite equipment 52 which, in turn, alternately connects and disconnects, in accordance with the dial impulses, ground to conductor E5 at its contacts 561 to pulse relay 550 in trunk circuit 50. Relay 550, at contacts 553, repeats the impulses to the calling bridge relay 660 in incoming selector 61. It might be well to mention at this time that a shunt relay is provided in each trunk circuit to shunt out impedance elements during impulsing to improve the pulsing ratio. As previously described, relay 310 operates in paystation adapter 20 during impulsing. In trunk circuit 40, shunt relay 460 operates from ground through unoperated contacts 434 on relay 430, operated contacts 445 on relay 440, and through its winding to battery. At its operated contacts 461, relay 460 shunts out the upper left winding of repeat coil RC51 during pulsing. In trunk circuit 50, shunt relay 600 operates from ground on unoperated contacts 551 of relay 550, through operated contacts 525 of relay 520, and through its winding to battery. Relay 600, at its operated contacts 601, shorts out the upper right winding of the repeat coil RC52 in composite equipment 52 during impulsing.

If it be assumed that the second digit dialed is "3," the impulses of the second digit cause a suitable switch in selector 61 to step to the third level. The selector then searches in that level until an idle connector, such as 65, is found. When incoming selector 61 switches through, the loop on conductors T7 and R7 is closed to the calling bridge relay 630 of connector 65, which operates.

The third, fourth, and fifth digits of the directory number dialed by the paystation subscriber serve to pulse relays 330, 430, 560, 550, and 630. The connector is thus stepped in its tens and units selecting motions and the ringing switch is stepped to a position corresponding to the ringing frequency or code of the called party.

When the called party answers in response to the ringing signal, answer bridge relay 620 operates over the line in the well known manner. At contacts 621, 622, 623 and 624, relay 620 reverses battery to trunk circuit 50. However, this reverse battery signal has no effect on trunk circuit 50. Battery through resistor R65, through operated contacts 625 of relay 620, is connected to conductor HS8, over cable 8, through incoming selector 61, over conductor HS7 to operate HS supervisory relay 510. Battery through resistance lamp L51 and through operated contacts 512 of relay 510 is now connected to the M5 lead of composite equipment 52, through the upper winding of relay 560, retard coil RT52, conductor R4 of the composited trunk line, the upper winding of relay 500, conductor M3, unoperated contacts 481 on relay 480, operated contacts 431 on relay 430, and lamp L41 to battery. Relay 500 operates in this circuit and connects ground through its operated contacts 501 to the E3 conductor, through operated contacts 444 on relay 440 to operate first supervisory relay 420.

Relay 420 operates and connects battery through resistor R44, operated contacts 424 on relay 420, conductor HS3, over cable 3 to the first selector 31, through selector 31 to the HS2 conductor, through operated contacts 365 of relay 360, to the unoperated contacts 255 of relay 250. It can be seen that this battery is ineffective to operate supervisory relay 240 in paystation adapter 20 until reverse battery relay 250 operates.

Returning to trunk circuit 40, the operation of relay 420 closes ground through its preliminary make contacts 423 and through its still unoperated contacts 422 to charge condenser C41 and operate the second supervisory relay 410. The combination of relay 410 and condenser C41 constitutes a timing device which is used to determine whether the signal received from trunk circuit 50 is a steady or a flashing supervisory signal. The complete operation of relay 420 connects ground through its preliminary make contacts 423 and through its now operated contacts 421 to an open contact 411 on relay 410. If relay 420 remains operated for a period of time which is greater than the discharge time of capacitor C41 in series with resistor R41 and the inductive winding of relay 410, relay 410 will release. When relay 410 releases with relay 420 still operated, the circuit is closed to operate the third supervisory relay 400. Relay 400, at contacts 401, 402, 403 and 404, reverses the battery over conductors T3 and R3 which results in the operation of reverse battery relay 250 in paystation adapter 20. Relay 250 closes a locking circuit through its upper winding from ground on operated contacts 366 on relay 360 and its operated contacts 251. The previously described circuit on conductor HS2 is now closed through operated contacts 255 on relay 250 to operate supervisory relay 240. At contacts 241, 242, 243 and 244, relay 240 re-reverses battery over conductors T1 and R1 to the paystation apparatus. Operation of relay 250, at contacts 254, releases relay 300. At contacts 302, 303, 304 and 305, relay 300 disconnects the calling bridge relay 330, which releases, and metallically connects conductors T1 and R1 to conductors T2 and R2, respectively. At contacts 332, relay 330 opens the circuit to relay 320 which now releases. The circuits are now in condition for conversation between the calling and called parties.

When the calling party replaces his receiver at the termination of the conversation, relay 430, which was being held over the calling loop, is released. At contacts 432, relay 430 shifts the M3 lead from resistance battery to ground to release the polar duplex relay 560 in composite equipment 52 which, in turn, releases pulse-in relay 550 in trunk circuit 50. Relay 550, at contacts 553, releases calling bridge relay 630 in connector 65. Relay 620, in connector 65, releases to remove battery from the HS8 conductor. Relay 510 in trunk circuit 50 releases and, in turn, connects ground to the M5 lead to release polar duplex relay 500 in composite equipment 51. Removal of ground from conductor E3 by the release of polar duplex relay 500 releases relay 420 in trunk circuit 40 which, in turn, releases relay 400. The release of relay 420 in trunk circuit 40 also shifts the conductor HS3 from resistance battery to resistance ground to release relay 240 in paystation adapter 20. In trunk circuit 40 slow release relay 440 finally releases to remove ground at contacts 446 from conductors S3 and S2.

In response to the removal of ground from the sleeve conductor S2, relay 350 in paystation adapter 20 releases. Ground through operated contacts 361 of relay 360 is now conducted through unoperated contacts 352 of relay 350 and through the winding of coin control relay 230 to battery. Relay 230 operates and, at contacts 231, closes an alternate hold circuit for relay 250. Also, 60 I. P. M. ground is now connected through interrupter contacts 261, operated contacts 235 of relay 230, unoperated contacts 228 of relay 220, the lower winding of coin control 1 relay 220 to battery. Ground is also connected through operated contacts 233 of relay 230 and the upper winding of relay 220 to battery. Since relay 220 is differentially connected it will not operate until ground is removed from the 60 I. P. M. contacts 261. This insures that coin potential will not be routed to the paystation equipment for a period of time less than a full 60 I. P. M. pulse.

When interrupter contacts 261 open, relay 220 operates over its upper winding. The next closure of contacts 261 routes ground through operated contacts 235 of relay 230, operated contacts 227 of relay 220, and the winding of coin relay 210 to battery. Relay 210 operates in this circuit. +110 volts is now connected through operated contacts 252 of reverse battery relay 250, operated contacts 226 of relay 220, the winding of coin supervisory relay 200, operated contacts 212 of relay 210, and through operated contacts 221 and 223 of relay 220 to the T1 and R1 conductors in parallel to collect the coin at the paystation in a well known manner. Relay 200 holds operated in series with the coin magnet at the paystation and at contacts 201 serves to maintain relay 230 operated. When the coin is collected and the paystation magnet removed from the line, relay 200 releases and opens the locking circuit for relay 230 which then releases. Release of relay 230 releases relays 220, 210, and reverse battery relay 250.

*All trunks busy*

If all connectors, such as connector 65, in the third level of incoming selector 61 are busy and incoming selector 61 hunts to overflow at the completion of the second digit, 120 I. P. M. battery is connected through interrupter contacts 652, operated overflow contacts 651 to the HS7 conductor. This battery flashes the HS supervisory relay 510 at 120 I. P. M. and relay 510 flashes the M5 lead between resistance battery and ground. In response to the flash busy returned over the trunk line, the polar duplex relay 500 is flashed at 120 I. P. M. and serves to connect and disconnect ground to the E3 conductor at contacts 501. The first impulse of the flashing supervisory signal operates relay 420. Relay 420 closes ground through its preliminary make contacts 423 and through its still unoperated contacts 422 to the timing device comprising condenser C41 in parallel with relay 410. This ground charges condenser C41 and operates relay 410. The discharge time of the condenser C41 in series with resistor R41 and the winding of relay 410 is great enough to maintain relay 410 operated during the flashing of relay 420. It can be seen that each time relay 420 releases and reoperates it recharges condenser C41 and reenergizes relay 410 so that relay 410 will remain operated for the duration of the flashing supervision. Since relay 410 remains operated, relay 400 cannot operate to reverse battery since its circuit is held open by operated contacts 411 on relay 410. When the calling party releases in response to the busy tone, which is returned over the tip and ring conductors from selector 61, the loop is opened to relay 330 which releases. At contacts 331, relay 330 opens the loop to succeeding circuits to initiate the release of same. Relay 320 releases when relay 330 releases. When ground is removed from conductor S2, as previously described, relay 350 releases, relay 230 operates, relay 360 releases. Operation of relay 230 opens the circuit to paystation relay 300 at contacts 234. Relay 300 releases but performs no function at this time. As previously described, relays 220 and 210 operate. Since reverse battery supervision was not received and relay 250 is not operated, —110 volts is connected through operated contacts 225 of relay 220, unoperated contacts 253 of reverse battery relay 250, operated contacts 226 of relay 220, the winding of relay 200, operated contacts 212 of relay 210, and through operated contacts 221 and 223 on relay 220 to conductors T1 and R1 in parallel to refund the coin in the well known manner.

*Line busy*

If the called line is found busy, the busy test relay 640 in connector 65 operates in the well known manner and connects 60 I. P. M. battery through interrupter contacts 653, operated contacts 641 of relay 640, unoperated contacts 626 of relay 620, to the HS8 conductor. Relays 510, 500, 420 flash at 60 I. P. M. in the same manner as described for the all trunks busy condition. Relay 410 remains operated as previously described over this flashing supervision and prevents relay 400 from reversing battery over conductors T3 and R3 so that the coin will be automatically refunded when the calling party hangs up.

If station Sta. 1 is not a paystation, paystation adapter 20 is ineffective and serves merely to connect the conductors T1 and R1 to conductors T2 and R2, respectively, through normal contacts of relays 220, 240 and 300. Conductor S1 is connected to conductors S2 through unoperated contacts of relays 230 and 360. Trunk circuit 40 and succeeding equipment function exactly as previously described to extend the call to station Sta. 2 in office C.

CALL FROM TOLL BOARD 71 IN OFFICE A TO STATION STA. 2 IN COMMUNITY DIAL OFFICE C

The operator at toll board 71 initiates a call by inserting plug P71 into jack J71. Sleeve relay 700 operates from ground through its upper high resistance winding over the sleeve jack conductor S10, the sleeve of the calling cord, and through the supervisory lamp L71 to battery. Sleeve assist relay 710 operates from ground through operated contacts 701 on relay 700. Supervisory lamp L71 is now illuminated from ground on unoperated contacts 751 on relay 750, operated contacts 713 on relay 710, the low resistance winding of relay 700, and through the lamp to battery.

Battery, through resistance lamp L72 and through normal contacts 742 of relay 740, or unoperated contacts 733 of relay 730, is now connected through operated contacts 711 of relay 710, conductor M10, upper winding of relay 760, retard coil RT71, conductor R11 of the composited trunk line, retard coil RT81, upper winding of relay 840, conductor M12, and unoperated contacts 822 on relay 820 to ground. Polar duplex relay 840 operates in this circuit and serves to place ground on the E12 conductor to operate pulse relay 800 in trunk circuit 80. Release delay relay 810 operates from ground through operated contacts 803 on relay 800.

The loop to the calling bridge relay in incoming selector 81 is closed by the operation of the pulse relay 800 in the following manner: conductor T12, through the upper right winding of repeat coil RC82 associated with composite equipment 82, back over the A12 conductor, through resistor R83, over the B12 conductor, through the lower right winding of repeat coil RC82, back over R12 conductor and through operated contacts 801 on relay 800 to the R13 conductor.

When the operator throws the dial key (not shown), associated with toll board 71, battery is placed on the T10 conductor and ground on the R10 conductor, as disclosed in the above-identified Reagan application. The battery on conductor T10, through the upper left winding of repeat coil RC72 in composite equipment 72 and over conductor A10, operates off-normal relay 730. Ground on the R10 conductor, through the lower left winding of repeat coil RC72, conductor B10, and through operated contacts 732 on relay 730, operates the pulse relay 720. Ground through operated contacts 731 on relay 730 and through operated contacts 721 on relay 720 operates off-normal 1 relay 740 which locks through its operated contacts 741 independently of contacts 721. It is to be noted that operation of these relays insures that a false pulse will not be sent over the M lead while the circuit is being prepared for pulsing. Contacts 722 close an alternate path for the resistance lamp battery before contacts 742 open.

The ground on the ring R10 lead is interrupted by the dial springs of the operator's dial (not shown) and pulse relay 720 follows these impulses. M10 lead battery is pulsed at contacts 722 of relay 720 to pulse the polar duplex relay 840 in composite equipment 82. Relay 840 repeats the impulses over conductor E12, at contacts 841, to relay 800 and relay 800 repeats the impulses to succeeding circuits at its contacts 801. In trunk circuit 80, relay 830 operates on the first release of relay 800, during impulsing, from ground through unoperated contacts 802 on relay 800 and operated contacts 811 on relay 810. Relay 830 remains operated over the impulses of a digit and at operated contacts 831 shunts the upper right winding of repeat coil RC82. Since this call is to be routed to subscriber Sta. 2 in office C, the operator will dial the digit "7" and the incoming selector 81 will be stepped to level seven and hunt in that level to seize an idle trunk circuit such as trunk circuit 40.

The loop closed by operated contacts 801 on relay 800 is now connected through incoming selector 81 to seize calling bridge relay 430 in trunk circuit 40. As previously described, the operation of relay 430 serves to operate relay 440 and also to connect battery through lamp L41 to the M3 lead to seize relays 550 and 520 in trunk circuit 50. Relay 520 closes the loop to incoming selector 61, as previously described.

Further digits dialed by the operator are now repeated by relay 720 in trunk circuit 70, the polar duplex relay 840 in composite equipment 82, relay 800 in trunk circuit 80, relay 430 in trunk circuit 40, polar duplex relay 560 in composite equipment 52, relay 550 in trunk circuit 50 and the calling bridge relay in either the incoming selector 61 or the calling bridge relay 630 in connector 65.

If an all trunks busy condition is encountered by incoming selector 61, 120 I. P. M. battery is connected to the HS7 lead, as previously described, to flash the HS supervisory relay 510. Relay 510 flashes the M5 lead in accordance with the flashing supervisory signal to alternately operate and release polar duplex relay 500 which, in turn, repeats the flashing supervision to the first supervisory relay 420. Relay 420 repeats the flashing to the HS3 conductor by alternately connecting battery through resistor R44 and its operated contacts 424 and ground through resistor R45 and its unoperated contacts 425. This flashing battery and ground on conductor HS3 is connected over cable 3 through incoming selector 81 to the HS13 lead to flash supervisory relay 820 in trunk circuit 80. Relay 820 connects battery through resistance lamp L81 and through its operated contacts 821 and over the M12 conductor to flash the polar duplex relay 760 in composite equipment 72 which, in turn, flashes the E10 conductor to alternately operate and release supervisory relay 750 in trunk circuit 70. Ground through unoperated contacts 751, operated contacts 713 on relay 710, and through the low resistance winding of the relay 700 and over the sleeve 10 conductor illuminates supervisory lamp L71. Lamp L71 will not light in series with the high resistance winding of sleeve relay 700 but it is illuminated from ground through the low resistance winding. Thus, the flashing of contacts 751 on relay 750 will alternately illuminate and extinguish supervisory lamp L71.

If a line busy condition should be encountered in connector 65, relay 640 in the connector serves to connect 60 I. P. M. battery to the HS8 lead, as previously described. This flashing is repeated by relays 510, 500, 420, 820, 760 and 750 to flash the operator's supervisory lamp L71 at 60 I. P. M.

When the operator restores her dial key at the completion of dialing, battery is removed from tip conductor T10 and ground is removed from ring conductor R10. Relays 730, 720 and 740 in trunk circuit 70 release.

If the called line is idle, the connector switches through to seize line circuit 62 and to ring the ringer at substation Sta. 2. When the called party answers in response to the ringing signal, answer bridge relay 620 operates, as previously described. Relay 620 connects battery through resistor R65 and through its operated contacts 625 to the HS8 conductor. This steady supervisory signal operates relay 510 in trunk circuit 50 which repeats the steady supervisory signal to relays 500, 820 and 750. The operation of relay 750 serves to open contacts 751 so that the operator is given steady dark supervision by supervisory lamp L71.

When the operator wishes to release the connection at the termination of the conversation, she withdraws plug P71 from jack J71 to release relay 700. Relay 710 releases and connects the M10 lead to ground through its now unoperated contacts 712. The polar duplex relay 840 releases to remove ground from conductor E12 and thus release relay 800 in trunk circuit 80. Relay 800, at contacts 801, opens the loop to trunk circuit 40 to release trunk circuit 40 and the succeeding circuits, as previously described.

CALL FOR TOLL BOARD 71 IN OFFICE A TO STATION STA. 1 IN OFFICE B

Trunk circuits 70 and 80 function in the same manner as previously described to seize incoming selector 81. Dialing of the digit "2" into the incoming selector 81 causes the incoming selector to seize connector 32. Further digits dialed into connector 32 serve to direct the connector to seize and ring the called line in the well known manner.

CALL FROM STATION STA. 2 IN OFFICE C TO STATION STA. 1 IN OFFICE B

Removal of the receiver by the subscriber Sta. 2 in office C serves to connect the station line conductors to the first selector 64 in a well known manner. The subscriber then dials the digit "5" into selector 64 and selector 64 hunts in level five and switches through to idle trunk circuit 50. Calling bridge relay 530 in trunk circuit 50 operates over the following path: ground through its upper winding, unoperated contacts 521 on relay 520, the A5 conductor, upper right winding of repeat coil RC52, conductor T5, unoperated contacts 611 on relay 610, conductor T6, through the subscriber's subset, back over conductor R6, unoperated contacts 613 on relay 610, conductor R5, lower right winding of repeat coil RC52, conductor B5, unoperated contacts 523 on relay 520 and through its lower resistance winding to battery.

Release delay relay 540 operates from ground through contacts 531 of relay 530. Battery, through resistance lamp L51, operated contacts 533 of relay 530, unoperated contacts 511 of relay 510, is connected to the M5 lead to operate the polar duplex relay 500 in composite equipment 51. Relay 540, upon operation, connects ground through contacts 542 to sleeve conductor S6 to hold operated the preceding circuits. Operation of relay 500 closes ground through its contacts 501 to the E3 lead and through unoperated contacts 443 on relay 440 to operate the pulse-in relay 450 in trunk circuit 40. Switching relay 470 operates from ground on operated contacts 452 of relay 450. A loop is now closed to the incoming selector 41 over a circuit extending from conductor T9, operated contacts 477 of relay 470, through the upper left winding of repeat coil RC51, conductor A3, operated contacts 471A on relay 470, resistor R43, operated contacts 473 on relay 470, conductor B3, the lower left winding of repeat coil RC51, operated contacts 478 of relay 470, operated contacts 453 of relay 450 to conductor R9. This loop circuit seizes the calling bridge relay in the incoming selector 41 and ground returned from incoming selector 41 over the S9 lead and through operated contacts 479 of relay 470 energizes the lower hold winding of the switching relay 470.

Dial impulses are repeated by calling bridge relay 530, polar duplex relay 500 and pulse-in relay 450. Relay 450 repeats the impulses to the incoming selector 41 at its contacts 453. Succeeding digits which are utilized to direct the operation of connector 32 are repeated in the same manner.

When the called party at Sta. 1 answers in response to a ringing signal, connector 32 serves to connect resistance battery to conductor HS9 of trunk circuit 40 to operate the fourth supervisory relay 480. Relay 480 connects battery through resistance lamp L41 and through its operated contacts 482 to the M3 conductor to operate relay 560 in composite equipment 52. Relay 560, at contacts 561, connects ground to the E5 conductor and through operated contacts 543 of relay 540 to operate the supervisory relay 610 in trunk circuit 50. Relay 610, at contacts 611, 612, 613 and 614, reverses battery over conductors T6 and R6 to the preceding equipment.

When the calling party restores his receiver, the loop is opened to calling bridge relay 530 which releases. Relay 530 removes battery from the M5 conductor to release polar duplex relay 500 and pulse-in relay 450. Relay 450 opens the loop to connector 32 at contacts 453. When connector 32 releases, ground is removed from conductor S9 to release relay 470 and resistance battery is removed from conductor HS9 to release relay 480. Release of relay 480 switches the M3 conductor to ground to release the polar duplex relay 560 which, in turn, removes ground from the E5 conductor to release relay 610. Slow release relay 540 in trunk circuit 50 releases to remove ground from conductor S6 and thereby release the preceding circuits.

It is believed apparent from the above description that a trunk circuit has been provided which can be utilized to route calls from either a local switch train or from a toll train over a trunk line to a distant office. It should also be apparent that this trunk circuit provides the proper supervision to either the local switch train or to the toll train.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a telephone system having first and second exchanges interconnected by a trunk line, a trunk circuit in said first exchange terminating said trunk line, means in said first exchange for extending a connection to said trunk circuit, said connection including line conductors, means in said trunk circuit for extending the connection over said trunk line to said second exchange, means in said second exchange for returning a steady supervisory signal over the trunk line to the trunk circuit, means in said second exchange for returning a flashing supervisory signal over the trunk line to the trunk circuit, and means in said trunk circuit responsive only to said steady supervisory signal for reversing battery over said line conductors.

2. In a telephone system having first and second exchanges interconnected by a trunk line, a trunk circuit in said first exchange terminating said trunk line, means in said first exchange for extending a connection to said trunk circuit, said connection including line conductors, means in said trunk circuit for extending the connection over said trunk line to said second exchange, means in said second exchange for returning a steady supervisory signal over the trunk line to the trunk circuit, means in said second exchange for returning a flashing supervisory signal over the trunk line to the trunk circuit, means in said trunk circuit operative in response to said steady supervisory signal to reverse battery over said line conductors and operative in response to said flashing supervisory signal to prevent the reversal of battery over said line conductors.

3. In a telephone system having first and second exchanges interconnected by a trunk line, a trunk circuit in said first exchange terminating said trunk line, means in said first exchange for extending a connection to said trunk circuit, said connection including line conductors and a control conductor, means in said trunk circuit for extending the connection over said trunk line to said second exchange, means in said second exchange for returning a steady supervisory signal over the trunk line to the trunk circuit, means in said second exchange for returning a flashing supervisory signal over the trunk line to the trunk circuit, means in said trunk circuit responsive to said steady supervisory signal for repeating said steady supervisory signal over said line conductors and said control conductor, and responsive to said flashing supervisory signal for repeating said flashing supervisory signal over only said control conductor.

4. In a telephone system having first and second exchanges interconnected by a trunk line, a trunk circuit in said first exchange terminating said trunk line, means in said first exchange for extending a connection to said trunk circuit, said connection including line conductors and a control conductor, means in said trunk circuit for extending the connection over said trunk line to said second exchange, means in said second exchange for returning a steady supervisory signal over the trunk line to the trunk circuit, means in said second exchange for returning a flashing supervisory signal over the trunk line to the trunk circuit, a source of potential, means in said trunk circuit operative in response to said steady supervisory signal for reversing battery over said line conductors and for connecting said source of potential to said control conductor, and operative in response to said flashing supervisory signal to prevent the reversal of battery over said line conductors and for connecting said supervisory potential to said control conductor.

5. In a telephone system having first and second exchanges interconnected by a trunk line, a trunk circuit in said first exchange terminating said trunk line, means in said first exchange for extending a connection to said trunk circuit, said connection including line conductors, means in said trunk circuit for extending the connection over said trunk line to said second exchange, means in said second exchange for returning a steady supervisory signal over the trunk line to the trunk circuit, means in said second exchange for returning a flashing supervisory signal comprising pulses over the trunk line to the trunk circuit, first means in said trunk circuit operated continuously in response to said steady supervisory signal and operated and released in accordance with the pulses of said flashing supervisory signal, timing means in said trunk circuit having an operating time greater than the interval of time between succeeding pulses of the flashing supervisory signal, means for initiating a timing operation of said timing means in response to a first operation of the first means, means for arresting and resetting the timing operation of the timing device each time the first means is released and reoperated, and means responsive to the completion of the timing operation of the timing means for reversing battery over said line conductors.

6. In a telephone system having first and second exchanges interconnected by a trunk line, a trunk circuit in said first exchange terminating said trunk line, means in said first exchange for extending a connection to said trunk circuit, said connection including line conductors and a control conductor, means in said trunk circuit for extending the connection over said trunk line to said second exchange, means in said second exchange for returning a steady supervisory signal over the trunk line to the trunk circuit, means in said second exchange for returning a flashing supervisory signal comprising pulses over the trunk line to the trunk circuit, first means in said trunk circuit operated continuously in response to said steady supervisory signal and operated and released in accordance with the pulses of said flashing supervisory signal, a source of potential, means responsive to each operation of said first means for connecting said source of potential to said control conductor, timing means in said trunk circuit having an operating time greater than the interval of time between succeeding pulses of the flashing supervisory signal, means for initiating a timing operation of said timing means in response to a first operation of the first means, means for arresting and resetting the timing operation of the timing device each time the first means is released and reoperated, and means responsive to the completion of the timing operation of the timing means for reversing battery over said line conductors.

7. In a telephone system having first and second exchanges interconnected by a trunk line, a trunk circuit in said first exchange terminating said trunk line, means in said first exchange for extending a connection to said trunk circuit, said connection including line conductors, means in said trunk circuit for extending the connection over said trunk line to said second exchange, means in said second exchange for returning a steady supervisory signal over the trunk line to the trunk circuit, means in said second exchange for returning a flashing supervisory signal comprising pulses over the trunk line to the trunk circuit, a first relay in said trunk circuit operated continuously in response to said steady supervisory signal and operated and released in accordance with the pulses of said flashing supervisory signal, a second relay in said trunk circuit having a release time greater than the interval of time between succeeding pulses of the flashing supervisory signal, means responsive to a first operation of the first relay for operating said second relay, means for reenergizing the second relay each time the first relay is released and reoperated, a third relay, means responsive to the release of the second relay for operating said third relay, and means responsive to the operation of said third relay for reversing battery over said line conductor.

8. In a telephone system having first and second exchanges interconnected by a trunk line, a trunk circuit in said first exchange terminating said trunk line, means in said first exchange for extending a connection to said trunk circuit, said connection including line conductors and a control conductor, means in said trunk circuit for extending the connection over said trunk line to said second exchange, means in said second exchange for returning a steady supervisory signal over the trunk line to the trunk circuit, means in said second exchange for returning a flashing supervisory signal comprising pulses over the trunk line to the trunk circuit, a first relay in said trunk circuit operated continuously in response to said steady supervisory signal and operated and released in accordance with the pulses of said flashing supervisory signal, a source of potential, means responsive to each operation of said first relay for connecting said source of potential to said control conductor, a second relay in said trunk circuit having a release time greater than the interval of time between succeeding pulses of the flashing supervisory signal, means responsive to a first operation of the first relay for operating said second relay, means for reenergizing the second relay each time the first relay is released and reoperated, a third relay, means responsive to the release of the second relay for operating said third relay, and means responsive to the operation of said third relay for reversing battery over said line conductors.

References Cited in the file of this patent

UNITED STATES PATENTS

| | | |
|---|---|---|
| 1,889,564 | Ostline et al. | Nov. 29, 1932 |
| 2,021,291 | Clark et al. | Nov. 19, 1935 |
| 2,621,258 | Balzer | Dec. 9, 1952 |
| 2,669,606 | Kessler et al. | Feb. 16, 1954 |
| 2,745,903 | Kessler | May 15, 1956 |